July 19, 1960
F. R. BARNES ET AL
2,945,379
ACCELEROMETER AND MAGNETO-RESISTIVE
ELECTROMECHANICAL TRANSDUCER
USED THEREIN
Filed Aug. 25, 1955
2 Sheets-Sheet 1
*Fig. 1.*
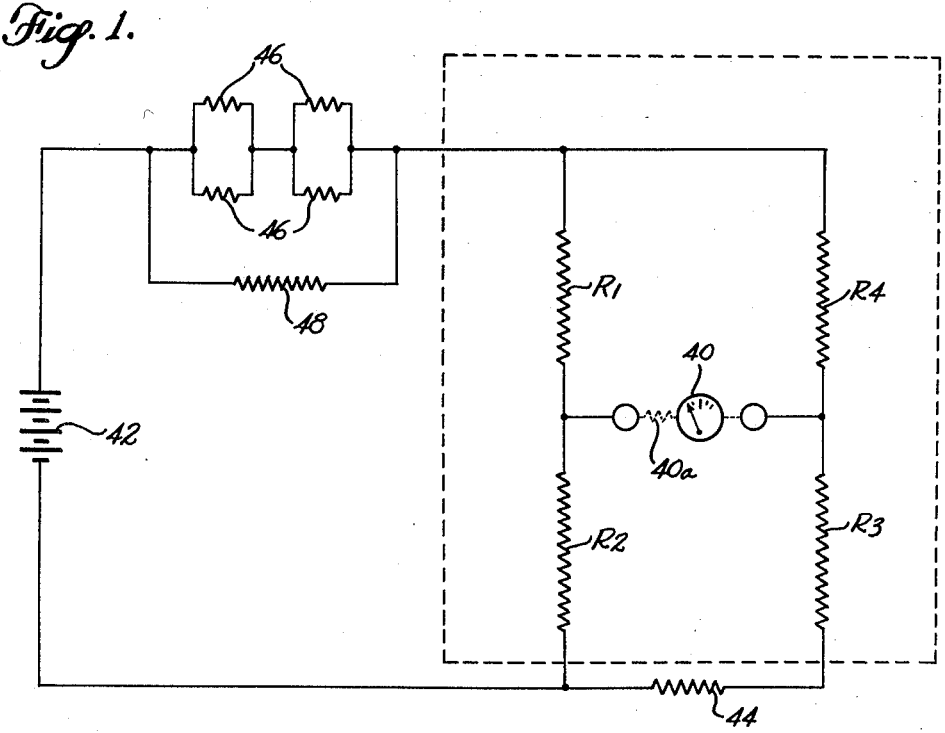
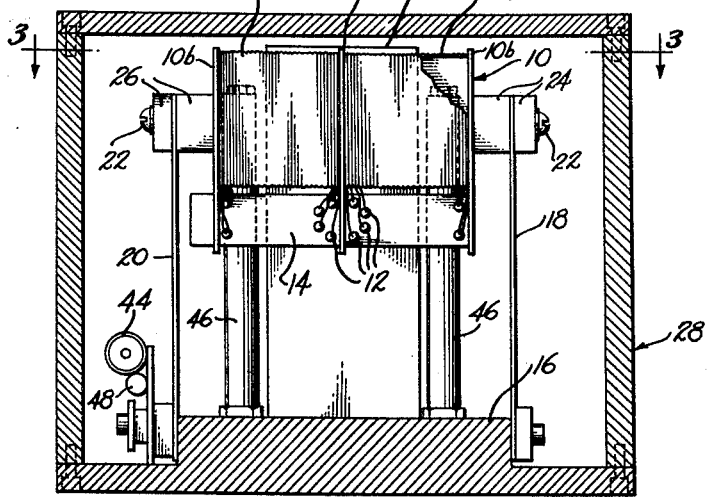
*Fig. 2.*
INVENTORS.
FREDRIK R. BARNES
LEONARD R. GREENAWAY
BY
Reynolds, Beach & Christensen
ATTORNEYS

INVENTORS.
FREDRIK R. BARNES
LEONARD R. GREENAWAY
BY

ATTORNEYS

United States Patent Office 2,945,379
Patented July 19, 1960

2,945,379

ACCELEROMETER AND MAGNETO-RESISTIVE ELECTROMECHANICAL TRANSDUCER USED THEREIN

Fredrik R. Barnes, Kent, and Leonard R. Greenaway, Seattle, Wash., assignors to Boeing Airplane Company, Seattle, Wash., a corporation of Delaware Filed Aug. 25, 1955, Ser. No. 530,478

3 Claims. (Cl. 73—517)

This invention relates to an improved linear accelerometer and also to an improved transducer constituting an important feature thereof. The invention is herein illustratively described by reference to its presently preferred form; however, it will be recognized that certain changes and modifications therein with respect to details, both of form and of arrangement, may be made without departing from the novel subject matter.

One of the important objects of the invention is a linear accelerometer and transducer means incorporated therein which is not subject to friction nor to mechanical interaction between the cooperating movable and stationary displacement-detecting transducer elements. Consequently, the transducer means may be used in applications involving only the slightest of forces available for producing transducer displacement, and there is no tendency for the transducer to motor or undergo sustained vibration. An important related object is such a transducer means capable of developing electric output signals at relatively high power levels while retaining other desirable instrument characteristics as those herein disclosed.

A related object is an improved apparatus of the described type which is insensitive to motion along axes other than the selected direction of response, which has virtually infinite resolution, which exhibits low electrical spurious signal or "noise" output, which possesses negligible hystersis, which is conveniently temperature compensated, and which lends itself to incorporation in a bridge type circuit for sensing direction as well as magnitude of relative displacement between the active transducer elements.

Another object is such an instrument which is capable of detecting relatively large linear displacements in terms of its own size while satisfying the above-described objectives.

In accordance with important features of the invention as herein disclosed, each of two pairs of magneto-resistive grids are mounted in a plane perpendicular to a local magnetic field by guide means permitting relative linear motion between the magnetic field and such grids in the plane of the latter. The two grids of each such pair are disposed in superimposed registry and the pairs are mounted in mutually adjacent positions extending in alignment along the line of relative motion permitted by said guide means. The pairs of grids are located with relation to the magnetic field producing means so that a fractional area of each pair is traversed by approximately the same amount of flux in the neutral position of the grids, whereas the amount of traversing flux in each grid pair increases or decreases as the grids are deflected conjointly one way or the other in the direction of their alignment. The four grids are connected in the respective arms of an electrical bridge network so that relative displacement between the grids and the magnetic field from a predetermined neutral position in one sense causes change of resistance of the grids producing progressive bridge circuit unbalance of one polarity, whereas relative displacement in the opposite sense causes bridge circuit unbalance of the opposite polarity. The polarity and amount of unbalance is indicated by a suitable metering device to represent the degree and sense of deflection to be detected.

In the preferred accelerometer arrangement employing the above transducer combination the guide means comprises a pair of parallel resilient strips having corresponding ends anchored to the magnetic field structure and their opposite ends weighted and supportingly connected to the grids for guiding the latter to permit substantially lineal displacement thereof. To that end the resilient supporting strips are oriented with their planes perpendicular to the desired direction of acceleration to be detected, and the entire mechanism is immersed in oil for mechanical damping purposes. Negative temperature-resistance means connected in series with the power supply for the bridge circuit provides temperature compensation for the device.

These and other feature objects and advantages of the invention, together with certain preferred details of construction, will become more fully evident from the following description by reference to the accompanying drawings.

Figure 1 is a schematic diagram of the electrical circuit of the improved linear accelerometer or displacement detector.

Figure 2 is a transverse sectional view of the accelerometer device.

Figure 3:
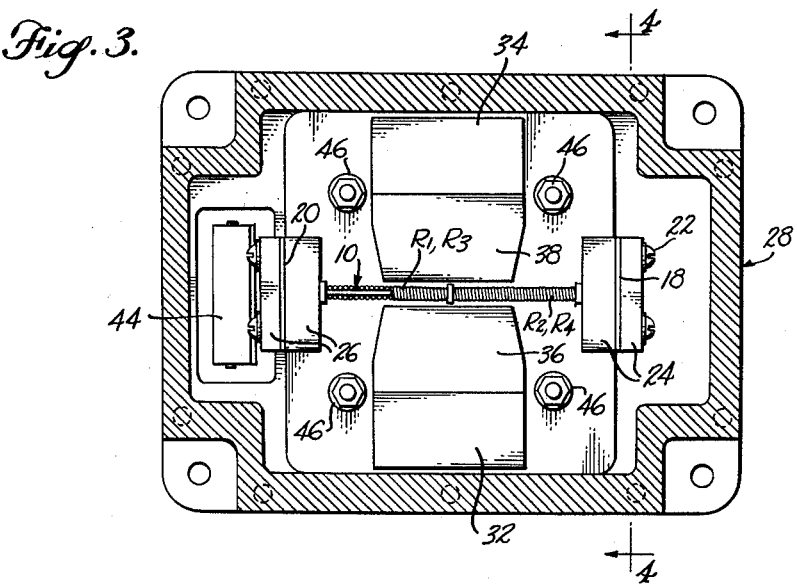
Figure 3 is another sectional view of the device taken on line 3—3 in Figure 2.

Referring to the drawings, it will be noted that the pair of magneto-resistive grid elements R1 and R3 are wound in mutually superimposed registry on one-half of the flat holder card 10, and that a similar pair of resistance elements R2 and R4 are similarly wound on the other half of the card. Each of the four resistance grids formed by these windings are identical, and each is a bifilar winding to avoid induced voltages producing reaction currents in the circuit in which such windings are connected. The device is thereby made free of any motoring or self-vibration tendency. By winding the pairs of resistance elements in mutually superimposed registry on the respective portions of the holder card, any magnetic flux which traverses any portion of the card perpendicularly thereto will pass equally through each winding of the pair carried by that portion of the card. Preferably in the manufacture of the device the windings of each pair are wound simultaneously, hence coil for coil and at the same pitch. The pairs are separated by an intermediate divider plate 10a slotted to pass the card transversely therethrough, and are retained on the card at the ends by the end plates 10b. The resistance grid wires extend to different selected soldering terminals 12 mounted on the terminal strip 14 which is in turn supported by the plates 10a and 10b, as shown. The various portions of the card assembly are non-magnetic.

Figure 4:
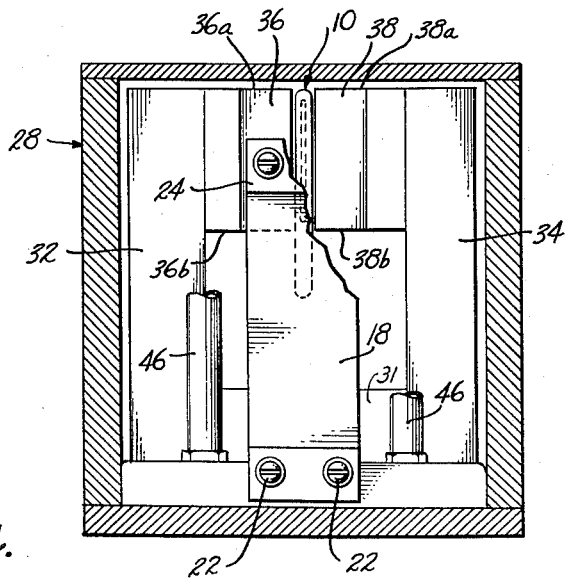
Figure 4 is another sectional view of the device taken on line 4—4 in Figure 3.

The card assembly, including the pairs of resistance grid elements R1, R3 and R2, R4, is mounted on a base 16 by means guiding the card to permit movement thereof in the direction of alignment of the pairs of resistance grid elements. For that purpose various devices could be employed to support and guide the card assembly. In the example the card is supported preferably by and between the projecting ends of two resiliently flexible strips 18 and 20 fastened by screws 22 at their opposite ends to the base 16, as illustrated in Figures 2 and 4. The strips 18 and 20 project in parallel relationship from the supporting base 16 to which they are fastened and the card assembly is fastened in place between the strips with the plane of the card disposed perpendicularly to the parallel planes of the strips and parallel to the projecting length of such strips. Consequently, as the strips are caused to flex one way or the other the card moves generally longitudinally in its own plane, although in so doing, because of the finite length of the strips, it follows a generally arcuate path, hence undergoes some lateral displacement in its own plane, but without changing its angular relationship to the plane of the base 16. It will become evident, however, that the transducer device including the pairs of resistance windings and magnetic field producing means to be described discriminates against any such lateral components of motion and responds solely to the longitudinal component which is in the direction of linear acceleration to be detected by the instrument.

The stiffness of the resilient strips 18 and 20 are spring supports for the linear accelerometer card assembly will be governed by the desired response characteristics of the instrument for particular applications. For the same reason, sets of weights 24 and 26 are fastened to the free ends of the respective spring strips in order to impart the desired mass to the card assembly. The base 16 forming a support for the spring strips 18 and 20 comprises a part of the bottom of an instrument case 28, which completely encloses the accelerometer components, and which is of liquid-tight construction permitting filling of the case with an oil or other suitable liquid to provide the desired degree of mechanical damping to the movable assembly. The viscosity of the oil, the stiffness or spring constant of the combined strips 18 and 20, and the mass of the movable structure comprising the weighted card assembly all affect the response characteristics of the instrument according to well known design considerations. Preferably the casing has a suitable expansion chamber (not shown) for the damping fluid.

The instrument further includes a permanent magnet structure for passing a magnetic field through selected fractional portions of the pairs of resistance windings. The magnet structure is mounted on a base 16, and includes the following magnetic path-defining ferromagnetic elements: the bar 31, the parallel post members 32 and 34 projecting upwardly from opposite ends thereof in spaced relationship, and the pole pieces 36 and 38 projecting toward each other from the upper ends of the posts. The mutually adjacent faces of the opposing pole pieces 36 and 38 extend parallel to the plane of the winding card 10, which is received in the air gap between such faces, as shown in Figure 3. The width of the magnetic pole faces measured lengthwise of the card, that is, in the direction of alignment of the pairs of windings thereon, is materially less than the spacing between the relatively opposite ends of the windings, so that only a portion of each pair of windings is subjected to the localized magnetic field traversing the card directly between the opposing magnetic pole pieces 36 and 38. The top and bottom faces of the pole pieces lie respectively above and below the top and bottom edges of the wound card so that any lateral displacement of the latter up or down relative to the field structure does not vary substantially the amount of flux traversing the resistance elements in the card. The supporting strips 18 and 20 are so located in relation to the magnetic field-producing structure that the card is centered in relation to the localized magnetic field traversing the same in the neutral position of the card assembly. As a result, when the instrument is subjected to linear acceleration in one sense along the direction of alignment of the resistance windings the amount of magnetic flux traversing one pair of windings progressively increases, while that traversing the other pair correspondingly decreases. A reverse action takes place during acceleration in the opposite sense. The bismuth wire or other magneto-resistive material used in the windings has the property of increasing its electrical resistance when subjected to increasing magnetic field strength; therefor linear accelerations of the instrument produce electrical response in the form of equal and opposite changes of electrical resistance in the respective pairs of grid elements R1, R3 and R2, R4, depending upon the sense and the amount of acceleration taking place.

The preferred manner in which these changes in electrical resistance are measured to produce an indication of the sense and the amount of acceleration is shown in Figure 1. It will be seen that the resistance grid elements R1 and R3, forming one of the pairs, are connected in the opposite sides of a bridge circuit in which the other two resistance elements R2 and R4, forming the other pair, are similarly connected. An unbalance-indicating galvanometer 40 having an internal resistance 40a is connected between one set of junctions in the bridge circuit whereas voltage from the source 42 is applied to the bridge circuit at the other set of junctions. A compensating resistance 44 is connected to one of the bridge arms, if necessary, in order to produce balance in the circuit under the condition of zero acceleration, as indicated by a reading of zero on the meter 40.

It will be recognized that such a transducer means by which linear acceleration is converted into readings on a galvanometer, wherein the indicating needle is deflected either to the right or to the left of the neutral position by certain amounts, depending upon the sense and amount of card deflection, is a highly accurate and sensitive arrangement for indicating physical displacements such as those produced by linear acceleration.

In order to compensate for temperature-resistance effects in the bridge circuit, four negative temperature-coefficient resistances, or four thermistors, 46 are used. These are connected in parallel pairs with the pairs arranged in series and interposed in one of the supply leads connecting the voltage source 42 to the bridge circuit. The network of thermistors 46 is by-passed by a common resistance element 48 which modifies or tempers the effect of the thermistors 46. The resulting combination of resistances increases the voltage applied to the bridge circuit as a function of increasing temperature to which the apparatus is subjected. The voltage-increasing effect of the thermistors is tailored by the added parallel resistance 48 to such an amount that it substantially equals and offsets the opposite change of resistance experienced by the resistance grid elements R1, R2, R3 and R4 as a function of varying temperatures. In order that this temperature compensation will be as accurate as possible the four thermistors 46 are mounted in upright positions on the four corners of the base 16, where they will experience temperature variations which on an average will be the same as these experienced by the resistance grid elements R1, R2, R3 and R4, especially when the apparatus is immersed in oil contained within the casing 28. The resistance elements 48 and 44 are suitably mounted in the case at any suitable location therein. No effort is made in Figures 2, 3 and 4 to show the electrical leads into the instrument through the casing wall for connection to the components, since these are matters of design detail and may vary.

Maximum power for producing deflection of the meter 40 proportional to accelerations being measured by the instrument is obtained if the impedance of the meter is approximately equal to the resistance of an individual resistance grid element R1, R2, R3 or R4. Relatively high power levels are thereby attainable so that very minute displacement of the card assembly is detected and indicated, whereas relatively large displacements are likewise indicated with accuracy. The use of bifilar windings for the resistance grid elements precludes the possibility of interaction forces which would cause motoring or sustained vibrations due to feed-back effects.

It will be noted that the upper faces 36a and 36b of the magnetic pole pieces 36 and 38 lie in a plane above the upper edge of the pairs of resistance grid windings, whereas the bottom faces 36b and 38b, respectively, of these pole pieces lie in a plane below the lower edge of these grid windings. This physical arrangement is employed to prevent slight arcuateness of the path of movement of the card assembly from affecting the change of electrical resistance of the grid elements. In other words, the amount of flux traversing any of the resistance grid elements is not changed by the lateral component of motion of the card assembly, but only by the longitudinal component of motion thereof along the desired axis of sensitivity.

Due to the helical form of the resistance grid elements wound on the card assembly the ability of the instrument to resolve slightly different amounts of mechanical displacement of the card assembly is virtually infinite. Moreover, it is found that the magneto-resistive effect is not accompanied by any appreciable amounts of spurious signal or "noise" output energy, nor is there any mechanical hysteresis or electrical or magnetic hysteresis in the apparatus tending to impair the accuracy of the readings obtained.

These and other advantages of the disclosed instrument operating on the magneto-resistive principle to detect linear accelerations or more generally to detect mechanical displacement or deflections will be evident to those skilled in the art.

We claim as our invention:

1. In a lineal displacement transducer device, the combination comprising two pairs of generally flat magneto-resistive grid elements, holder means maintaining said pairs of grid elements in substantially coplanar alignment with the two grid elements of each pair in substantially superimposed registry, a base, guide means on said base movably supporting said holder means to permit lineal displacement of said grid elements conjointly relative to said base in their direction of alignment from a neutral position, and a magnetic field structure on said base having opposed magnetic pole pieces disposed in substantial alignment perpendicularly to said grid plane and spaced apart to form an air gap therebetween accommodating said pairs of grid elements, said magnetic pole pieces having pole faces extending generally parallel to said coplanar pairs of grid elements and being of a width measured parallel to the direction of alignment of said pairs of grid elements materially less than the distance between the relatively opposite ends of said aligned grid element pairs, whereby only a fraction of the area in said plane occupied by each pair of grid elements is traversed by the magnetic field extending directly between said pole faces with said grid elements neutrally positioned, such fractional area progressively increasing in one pair and decreasing in the other pair with lineal displacement of such grid elements out of neutral position in one sense, thereby to produce an increase of resistance in one such grid element pair and a corresponding decrease of resistance in the other pair.

2. A linear accelerometer comprising, in combination two pairs of magneto-resistive electrical resistance elements, a substantially flat card-like holder carrying said pairs of resistance elements in substantially coplanar alignment with the two resistance elements of each pair in substantially superimposed registry, a base, a pair of resiliently flexible strips having corresponding ends fastened to said base to project freely therefrom in parallel relationship to support said holder card thereon for movement thereof in the direction of alignment of said pairs and in the plane thereof, permitted by flexure of said strips, a magnetic field structure on said base having opposed magnetic pole pieces disposed in substantial alignment perpendicularly to said grid plane and spaced apart to form an air gap therebetween accommodating said pairs of grid elements, said magnetic pole pieces having pole faces extending generally parallel to said coplanar pairs of grid elements and being of a width measured parallel to the direction of alignment of said pairs of grid elements materially less than the distance between the relatively opposite ends of said aligned grid element pairs, whereby only a fraction of the area in said plane occupied by each pair of grid elements is traversed by the magnetic field extending directly between said pole faces with said grid elements neutrally positioned, such fractional area progressively increasing in one pair and decreasing in the other pair with lineal displacement of such grid elements out of neutral position in one sense, thereby to produce an increase of resistance in one such grid element pair and a corresponding decrease of resistance in the other pair, means electrically connecting said pairs of resistance elements in a bridge circuit with the resistance elements of each pair being connected in positions opposite from each other in the bridge, and indicator means connected in said bridge circuit operatively to indicate the sense and amount of bridge circuit unbalance produced by deflection of said resistance element pairs.

3. The linear accelerometer defined in claim 2, wherein the individual magneto-resistive elements comprise bifilar windings, wound helically on the card-like holder, thereby avoiding inductive effects in said windings tending to produce motoring or self-vibrational action.

References Cited in the file of this patent

UNITED STATES PATENTS

| | | |
|---|---|---|
| 1,379,266 | Keeler | May 24, 1921 |
| 2,210,970 | Bonell | Aug. 13, 1940 |
| 2,643,869 | Clark | June 30, 1953 |
| 2,702,186 | Head | Feb. 15, 1955 |
| 2,712,601 | Reinwald | July 5, 1955 |